C. L. DUNHAM.
PIPE TONGS.
APPLICATION FILED FEB. 19, 1915.
1,158,656.
Patented Nov. 2, 1915.
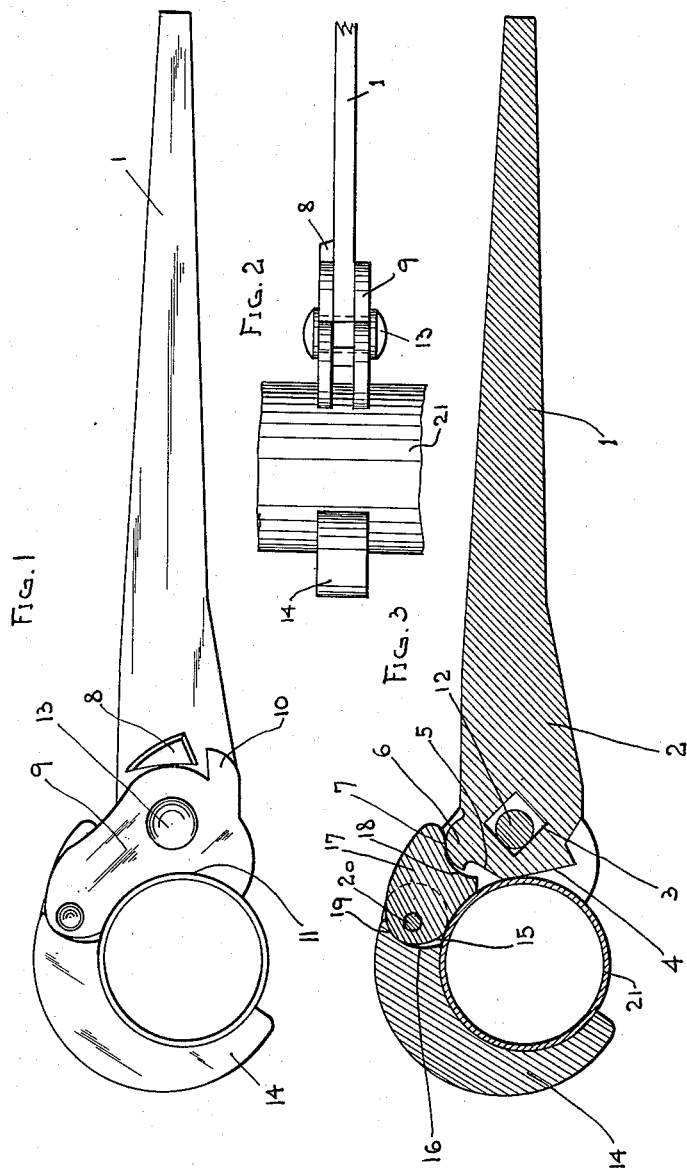
WITNESSES:
INVENTOR.
C. L. DUNHAM
BY
ATTORNEY.

UNITED STATES PATENT OFFICE.

CHARLES L. DUNHAM, OF PENNSBORO, WEST VIRGINIA.

PIPE-TONGS.

1,158,656.  Specification of Letters Patent.  Patented Nov. 2, 1915.

Application filed February 19, 1915. Serial No. 9,405.

*To all whom it may concern:*

Be it known that I, CHARLES L. DUNHAM, a citizen of the United States, residing at Pennsboro, in the county of Richie and State of West Virginia, have invented certain new and useful Improvements in Pipe-Tongs, of which the following is a specification.

This invention relates to pipe tongs and has for its object to provide an instrument of such class, in a manner as hereinafter set forth, with means for quickly and tightly gripping a pipe or pipe section for shifting the same when occasion so requires and further with means for quickly releasing the pipe or pipe section from the tongs when desired.

A further object of the invention is to provide a pair of pipe tongs, in a manner as hereinafter set forth, to prevent when in use the marring, damaging or injuring of the periphery of a pipe when the tool is employed in connection therewith.

A further object of the invention is to provide a pair of pipe tongs with means in a manner as hereinafter set forth to overcome the slipping of the gripping jaw with respect to the periphery of the pipe when the tool is employed in connection with a pipe or pipe section.

Further objects of the invention are to provide a pair of pipe tongs which is simple in its construction and arrangement, strong, durable, efficient and convenient in its use, quickly applied to a pipe or pipe section, and inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side view of a pair of pipe tongs in accordance with this invention showing the adaptation thereof in connection with the gripping of a pipe. Fig. 2 is a plan, the pipe and handle being broken away. Fig. 3 is a longitudinal sectional view.

Referring to the drawings in detail 1 denotes a handle, having its forward end angularly disposed as at 2 and provided with a rectangular opening 3. The forward edge of the handle 1 is inclined in opposite directions as at 4, 5, the latter being of less length than the former and which terminates in a lateral protuberance 6, having a cam surface 7. One side of the inclined portion 2 of the handle 1, near the opening 3, has a lateral extending triangular offset 8 which constitutes a stop in a manner as hereinafter referred to.

The pair of pipe tongs include a gripping jaw and a pair of supporting jaws and as each of these latter is of the same construction, but one will be described.

Each of the supporting jaws of said pair consists of a body portion 9, having one end provided with a lug 10, and its forward edge concave as at 11 to provide a seat. Eccentrically arranged with respect to the said pair of supporting jaws is a pin 12, which is cylindrical and extends through the opening 3 and is of materially less diameter than the length or width of the opening 12. The ends of the pin 12 are upset as at 13 and fixedly secured to the supporting jaws and the said pin 12 maintains the supporting jaws in parallelism.

The gripping jaw, indicated at 14, is semi-circular in contour and has its inner end reduced as at 15 to provide a cam surface 16 and the reduced end 15 of said gripping jaw 14 extends between the ends of the supporting jaws.

Arranged between the ends of the supporting jaws, between which the reduced end 15 of the gripping jaw extends, is a cam member 17, having a cam surface 18 and a cam surface 19 and the said cam member 17 is pivotally connected to a pin 20, upon which is pivotally mounted the reduced end 15 of the gripping jaw 14.

The cam surface 16 of the gripping jaw 14 and the cam surface 19 of the cam member 17 associate with each other and the cam surface 7 associates with the cam surface 18.

The cam member 17 is utilized for shifting the gripping jaw into engagement with the pipe 21 when the latter is mounted upon the seats 11. When the handle 1 is shifted the protuberance 6 will cause the cam surface 7, to engage the cam surface 18 and shift the free end of the cam member 7 outward, causing thereby the cam surface 19, to act against the cam surface 16 and force the gripping jaw 14 into a non-slipping engagement with the periphery of the pipe 15.

The lug 10 is engaged by the offset 8 to limit the movement of the handle 1 in the direction to cause the gripping member to engage the pipe 21.

When the handle 1 is shifted in the direction opposite to that stated the cam surface 17 is released and the gripping jaw 14 can be swung around the pipe 21 when the latter is released.

The opening 3 allows a free movement of the handle 1, so that the cam member 17 can be shifted when desired, and furthermore prevents any possibility of twisting the pin 12.

What I claim is:—

1. A pair of pipe tongs comprising a handle having a square opening at one end, a pair of supporting jaws providing seats and having a pin eccentrically attached thereto for connecting said jaws in parallelism, said pin extending through said opening, a gripping jaw pivotally connected at one end with the ends of said supporting jaws, and a cam member mounted upon the pivot for said gripping jaw and capable of cam engagement with the latter and further capable of being shifted by said handle causing thereby the gripping jaw to secure a pipe on said seats to prevent slipping of the latter.

2. A pair of pipe tongs comprising a handle having a square opening at one end, a pair of supporting jaws providing seats and having a pin eccentrically attached thereto for connecting said jaws in parallelism, said pin extending through said opening, a gripping jaw pivotally connected at one end with the ends of said supporting jaws, and a cam member mounted upon the pivot for said gripping jaw and capable of cam engagement with the latter and further capable of being shifted by said handle causing thereby the gripping jaw to secure a pipe on said seats to prevent slipping of the latter, said handle having a lateral protuberance and said cam member having a cam surface engaged by said protuberance when the handle is shifted causing thereby the shifting of said cam member to move the gripping jaw to or from operative position.

3. A pair of pipe tongs comprising a handle having a square opening at one end, a pair of supporting jaws providing seats and having a pin eccentrically attached thereto for connecting said jaws in parallelism, said pin extending through said opening, a gripping jaw pivotally connected at one end with the ends of said supporting jaws, and a cam member mounted upon the pivot for said gripping jaw and capable of cam engagement with the latter and further capable of being shifted by said handle causing thereby the gripping jaw to secure a pipe on said seats to prevent slipping of the latter, said handle having a lateral protuberance and said cam member having a cam surface engaged by said protuberance when the handle is shifted causing thereby the shifting of said cam member to move the gripping jaw to or from operative position, and a stop carried by the handle and capable of engaging one of said supporting jaws for limiting the movement of the handle in one direction.

In testimony whereof I affix my signature in presence of two witnesses.

CHARLES L. DUNHAM.

Witnesses:
ERNEST F. HEFLIN,
JOHN M. STOOPS.

Copies of this patent may be obtained for five cents each, by addressing the "Commissioner of Patents, Washington, D. C."